United States Patent Office 3,712,804
Patented Jan. 23, 1973

3,712,804
COMPOSITION FOR REGULATING THE GROWTH
AND METABOLISM OF PLANTS
Walter Muller and Hubert Mayr, Leonding, near Linz
(Danube), Ferdinand Weinrotter, Linz (Danube), Walter
Frohner, Pasching, near Linz (Danube), and Elfriede
Presoly and Gustav Kollisch, Linz (Danube) Austria,
assignors to Osterreichische Stickstoffwerk Aktiengesellschaft, Linz (Danube), Austria
No Drawing. Filed June 17, 1969, Ser. No. 834,170
Int. Cl. A01n 9/24
U.S. Cl. 71—113
6 Claims

ABSTRACT OF THE DISCLOSURE

A composition for regulating the growth and metabolism of plants, particularly for influencing their water balance, having as active ingredient a compound of the formula $$C_nH_{2n+1}.X.COOH$$

in which $n$ is an integer from 5 to 8 and X is a group of the formula

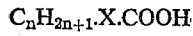
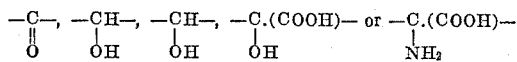

the salts, lower alkyl esters, lower hydroxyalkyl esters, amides, monoalkylamides or dialkylamides thereof, and the process for the treatment of plants using the said compositions.

The present invention relates to compositions for regulating the growth and metabolism of plants, particularly for influencing their water balance, and to a process for the treatment of plants using the said compositions.

Substances have been known for a considerable time which are capable of influencing the growth of plants without these substances being nutrients. Examples of such substances are weedkillers which are active as hormones, such as for example 2,4-dichlorophenoxy-acetic acid. Another group of so-called growth regulators are compounds, such as chlorocholine chloride, which influence the growth of plants, for example of wheat, in such a way that the stalks become shorter and stronger so that their standing strength is increased. Finally, decenylsuccinic acid is a compound which was found to impart to the culture plants treated therewith higher resistance to drought and frost, this being an effect which has been explained as being due to an increase in the permeability of the roots to water.

It has now been found that certain aliphatic monocarboxylic or dicarboxylic acids which are substituted in the α-position are able to influence the growth and metabolism of plants, especially their water balance, so that by treating plants with these compounds their yield and also their resistance against environmental factors such as for example drought, is increased. It is believed that the causes for these effects reside, on the one hand, in a reduced water throughput of the plants through a lowering of the transpiration, and on the other hand, through an increase in the ability of the treated plants to take up water.

In accordance with the present invention there is provided a composition for regulating the growth and metabolism of plants, especially for influencing their water balance, which comprises, as the active ingredient, a compound of the general formula $$C_nH_{2n+1}.X.COOH \qquad (I)$$

in which $n$ denotes an integer from 5 to 8 and X is a group of the formula:

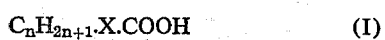
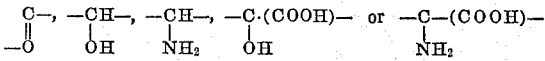

as the free acid, or in the form of a salt, lower alkyl ester, lower hydroxyalkyl ester, amide, monoalkylamide or dialkylamide thereof, or a mixture of two or more of such free acids or derivatives thereof, in admixture with one or more inert extenders or diluents, and wetting agents, if desired.

Examples of compounds of the Formula I which are suitable as the active ingredient in the compositions according to the invention, are α-hydroxycaprylic acid, α-ketocaprylic acid, α-hydroxyoenanthric acid, α-aminocaprylic acid, α-aminocapric acid, α-aminooenanthric acid, α-hydroxy-α-hexylmalonic acid and α-amino-α-hexylmalonic acid. Mixtures of such acids with one another, for example a mixture of α-hydroxypelargonic acid and α-hydroxycapric acid, may also be used. The carboxylic acids of Formula I may also be carboxylic acids having a branched carbon chain.

Examples of salts of the compounds of Formula I which may be used in the compositions of the invention, are salts with organic bases such as trimethylamine, diethanolamine and triethanolamine and also the alkali metal and ammonium salts. Examples of suitable esters are, in adidtion to those with lower aliphatic alcohols such as methyl esters, ethyl esters and butyl esters, also esters with alcohols which carry additional hydroxyl groups in the alcohol residue. As amides, it is also possible to use those which carry one or two lower alkyl residues on the amide nitrogen.

The compositions according to the invention may be either solid or liquid, with liquid compositions being preferably intended for use as spraying agents for the plant which has already emerged, the active compounds of Formula I being primarily intended to be absorbed through the leaves. Such liquid, primarily aqueous, spraying agents may be prepared by dissolving one or more soluble salts of the active compound of Formula I, for example the sodium, potassium or ammonium salts of α-hydroxycaprylic acid, the triethanolamine salt of α-hydroxycaprylic acid, the potassium salt of α-ketocaprylic acid and the alkali metal and ammonium salts of α-hydroxy-α-hexylmalonic acid in water together with a wetting agent. Non-ionic wetting agents such as alkylphenolpolyethylene ethers are preferred as wetting agents. Active compounds of Formula I which are sparingly soluble in water or entirely insoluble in water may also be used in the preparation of spraying agents. In this case, the composition is prepared in the form of a spraying powder, comprising the active compound, for example an amide of an acid of Formula I, such as alpha-hydroxycaprylic acid amide, the sodium salt of alpha-ketocaprylic acid or an alpha-aminoacid of Formula I, a dispersing agent such as an alkylarylsulphonate, sodium oleylmethyltauride and/or lignine sulphonate and a non-ionic wetting agent, and this spraying powder is dispersed in water before use. In order to provide a particular content of the active compound and facilitate the requisite fine grinding, the active compound is in most cases mixed with a solid inert extender such as kaolin, talc, clay or kieselguhr, or jointly ground therewith, when preparing the spraying powder. In some cases a water softening agent, such as for example ethylene-diamine-tetraacetic acid disodium salt, may be added.

Those active compounds of Formula I which are in the liquid form, such as for example the alkyl esters of the acids of Formula I, may be used to prepare emulsion concentrates, which form stable emulsions with water, with the addition of suitable emulsifiers and solvents. Suitable emulsifiers are for example combinations of alkylarylsulphonates with non-ionic surface-active agents such as for example polyoxyethylene-sorbitane, polyoxyethylenesorbitane tall oil ester, polyoxyethylene-alkylphenol, polyoxyethylene-triglyceride and polyoxyethylated sorbitane esters of a mixture of fatty acids and resin acids, and xylenes, cyclohexanone or dimethylformamide may be used as solvents.

Solid compositions, which may be incorporated into the soil preferably before the emergence of the plant, but also after the emergence of the plants, may be prepared by mixing active compounds which are soluble or at least slightly soluble, for example salts of the acids of Formula I, with solid inert extenders such as kaolin, talc, various kinds of clay or kieselgur.

A special case amongst the agents prepared according to the invention is represented by the disinfectants which may be used for the treatment of the seeds before sowing. Such disinfectants may be either liquid or solid. Liquid disinfectants are prepared by mixing the active compound with a volatile solvent, for example water, and a less volatile liquid which remains after evaporation of the solvent and improves the adhesion. Glycerine and ethylene glycol may be mentioned as such less volatile substances. Solid disinfectants are prepared by mixing the active compound with very finely ground inorganic extenders. In view of the nature of the active compounds, good adhesion of the dusting agents to the seed grains is provided. It is furthermore advisable to add a dyestuff such as ferric oxide or an organic dyestuff and a fungicide or bactericide in order to enhance the keeping properties.

When preparing the compositions according to the invention which are intended for use as spraying agents, inorganic or organic plant nutrients, plant protection agents or other growth regulators may be admixed with or dissolved in the finished liquid mixture. When preparing solid compositions, inorganic or organic fertilisers, plant protection agents, other growth regulators or soil improvement agents may be admixed with the active compounds or may serve as carriers and/or extenders. In the case of disinfectants, other plant protection agents may also be added.

The preparation of a solid composition in which an active compound according to the invention is admixed with ammonium sulphate and/or urea should here be particularly mentioned. It is prepared simply by mixing the active compound with the fertiliser, in a preferred proportion of 1.5 to 2 kg. of active compound per 100 kg. of fertiliser. Such a composition may be employed as a top fertiliser and when used in this way it simultaneously exerts a regulating effect on the growth and metabolism of the plants. The active compounds according to the invention also may be admixed with phosphorus or phosphorus-potassium fertilisers.

The present invention also provides a process for regulating the growth and metabolism of plants especially for improving their water balance, which comprises treating the plants themselves, their seeds before sowing or the surrounding soil, before or after the emergence of the plants, with an active compound of Formula I herein in the form of the free acid or a salt, lower alkyl ester, lower hydroxyalkyl ester, amide, monoalkylamide or dialkylamide thereof.

The process of this invention may be performed in such a way that the active compound of Formula I is taken up by the plant, for example through the leaves. This uptake is best effected by spraying with an aqueous spraying liquid which can be either a solution, prepared from an aqueous stock solution of a water-soluble compound, for example a salt; a suspension; prepared from a spraying powder which is suspended in water before use, or an emulsion, prepared from an emulsion concentrate which is emulsified in water. The treatment is preferably carried out on plants in a young stage (of development), for example at a height between 10 and 30 cm. in the case of grain. In cases where direct spraying of the plants is to be avoided, it is also possible to spray the soil around the plants, in which case the active compounds are then taken up through the root of the plant. The amounts employed are preferably between 0.5 and 15 kg./ha. and are matched to the local conditions, for example the moisture conditions. In many cases significant increases in yield will be achieved when using amounts of less than 10 kg./ha., these increases presumably being connected with an improvement in the ability of the plant to take up water, which is above all decisive for the development of the plant if the water supply of the soil is not too low.

Another variant of the process for treating plants is the incorporation of the active compounds into the soil, particularly before emergence of the plants. Here again the amounts used are preferably 0.5 to 15 kg./ha. Finally, the active compounds may also be applied to the seeds before planting in the form of disinfectants. Here it is advisable to use amounts in the lower range of the amount otherwise used, for example of less than 1 kg. per 100 kg. of seed material.

Since better growth of the plants is achieved by treating the plants in accordance with the invention, it is also necessary simultaneously to provide sufficient addition of fertiliser in order to be able fully to utilise the favourable effect of the compositions according to the invention on the plant.

The following examples illustrate some compositions according to the present invention.

EXAMPLE 1

A solution which contains 5.7% of the sodium salt of alpha-hydroxycaprylic acid, 0.25% of alkylpolyglycol ether and 94.05% of water, and which thus corresponds to an active compound content of 5% relative to free acid, is prepared by mixing the sodium salt of alpha-hydroxycaprylic acid with an alkylpolyglycol ether as the wetting agent and with water. This solution serves as the basis for a spraying agent and is brought to the concentration required for the desired use by dilution with water immediately before use.

EXAMPLE 2

The disodium salt of alpha-hydroxyhexylmalonic acid, an alkylphenolpolyglycol ether as the wetting agent, and water are mixed in such amounts that a solution results which corresponds to a composition of 12.2% of the disodium salt of alpha hydroxyhexylmalonic acid (corresponding to a 10% content of free acid), 0.5% of alkylphenylpolyglycol ether and 87.3% of water. This solution, which serves as the stock solution for a spraying agent, is diluted with water before use.

In a similar manner, the potassium salts of alphahydroxycaprylic acid and of alpha-ketocaprylic acid may also be formulated as a stock solution for a spraying agent with an active compound content of 5% (relative to free acid).

EXAMPLE 3

A solid mixture consisting of 20% of alpha-hydroxycaprylic acid amide, 7% of red iron oxide, 1% of colophony, 5% of spindle oil and 67% of talc, which may be employed for the disinfection of seeds, is produced by mixing the constituents.

EXAMPLE 4

A solid mixture the composition of which is composed of 5.7% of the sodium salt of alpha-hydroxycaprylic acid (corresponding to a free acid content of 5%), 1.0% of petroleum jelly oil, and 93.3% of sand (grain size 0.3–0.6 mm.) is produced by mixing the constituents. This mixture is suitable for use as a scattering agent for the treatment of soil.

EXAMPLE 5

A powder of the following composition is manufactured by mixing the constituents in finely ground form:

| | Percent |
|---|---|
| Alpha-aminocaprylic acid | 50 |
| Finely dispersed silica | 10 |
| Alkylarylsulphonate | 3 |
| Sodium ligninsulphonate | 7 |
| Kaolin | 30 |

This powder may be suspended in water and the suspension used as a spraying agent.

EXAMPLE 6

A powder of the following composition is manufactured by mixing the constituents in finely ground form:

| | Percent |
|---|---|
| Sodium salt of alpha-ketocaprylic acid (=20% relative to free acid) | 22.8 |
| Sodium oleylmethyltauride (64% strength) | 4 |
| Kaolin | 73.2 |

This powder may be suspended in water and the suspension used as a spraying agent.

EXAMPLE 7

A powder of the following composition is manufactured by mixing the constituents in finely ground form:

| | Percent |
|---|---|
| Alpha-hydroxycapyrylic acid amide | 20 |
| Sodium oleylmethyltauride (33% strength) | 10 |
| Kaolin | 70 |

This powder may be suspended in water and the suspension used as a spraying agent.

Other active compounds according to the present invention may also be formulated to give compositions in an analogous manner to Examples 1 to 7.

The action of the compositions manufactured according to the invention is more particularly described by reference to the following examples:

EXAMPLE 8

4 seeds of *Vicia faba* are placed in plastic pots filled with 400 g. of compost soil. After the appearance of the seedlings, the plants were reduced to two per pot. These plants were adjusted to a water capacity of 45%. After 5 weeks, when the plants had fully developed two pairs of leaves and had reached a height of 6 to 8 cm. 30 plants at a time were treated by spraying with aqueous solutions of alpha-ketocaprylic acid in concentrations of 1.0, 0.1 and 0.01% by weight, or by administering 0.5 and 0.25 g. per 30 plants through the soil. A further 30 plants remained untreated, as a control.

After a further 2 weeks, when the plants had developed 6 to 7 pairs of leaves and had a height of 27 to 30 cm., the water released by the plants was determined. The measurements were carried out in a greenhouse under approximately indentical external conditions and in particular on clear and cloudless days, in each case at the same time of day. As a measure of the transpiration, the relative percentage transpiration was determined according to the formula relative transpiration $$= \frac{\text{surface transpiration mg/dm}^2 \times \text{minute}}{\text{evaporation mg/dm}^2 \times \text{minute}} \times 100\%$$

In this formula the surface transpiration denotes the evaporation of the water from the moist surfaces of the live plant tissues, whilst the evaporation is the vapourisation of water from moistened green discs of blotting paper (=Piche small sheets).

The results are recorded in Table I below:

TABLE I

| Concentration of the solution of alpha-ketocaprylic acid | Surface transpiration, mg./dm.²/min. | Evaporation, mg./dm.²/min. | Relative transpiration in percent |
|---|---|---|---|
| 0.01% leaf treatment | 4.0 | 40.6 | 11.1 |
| 0.1% leaf treatment | 3.3 | 38.2 | 8.8 |
| 1.0% leaf treatment | 2.7 | 38.8 | 6.4 |
| 0.25 g. soil treatment | 4.4 | 31.2 | 14.3 |
| 0.5 g. soil treatment | 1.6 | 33.3 | 4.7 |
| Control | 5.6 | 20.3 | 27.9 |

The figures are mean values obtained from two leaf weighings.

A transpiration-lowering effect was found both on spraying and also on treating the soil with alpha-ketocaprylic acid.

EXAMPLE 9

Plastic pots were filled with 400 g. of meadow soil each, and 4 seeds of *Vicia faba* were then placed in each one. After emergence, the number of the plants per pot was reduced to 2. After 8 days, after the plants had formed two pairs of leaves and had reached a height of 5 to 6 cm., groups of 30 plants at a time were sprayed with aqueous solutions of alpha-hydroxycaprylic acid of 0.01, 0.1 and 1.0% concentration, or the soil was treated with amounts of 0.25 and 0.5 g. of this acid per 30 plants. 30 plants remained untreated as a control.

One week after the treatment, the relative transpiration was determined as specified in Example 8. At this point in time the plants had developed 3 pairs of leaves and had an average height of 18 to 20 cm.

The results are summarised in Table II below.

TABLE II

| Concentration of the solution of alpha-hydroxycaprylic acid | Surface transpiration, mg./dm.²/ min. | Evaporation, mg./dm.²/ min. | Relative transpiration in percent |
|---|---|---|---|
| 0.01% leaf treatment | 17.5 | 47.0 | 37.1 |
| 0.1% leaf treatment | 18.5 | 42.7 | 43.4 |
| 1.0% leaf treatment | 22.1 | 42.7 | 51.9 |
| 0.25 g. soil treatment | 15.6 | 42.5 | 36.8 |
| 0.5 g. soil treatment | 17.8 | 42.5 | 41.9 |
| Control | 12.7 | 23.0 | 55.3 |

The values represent mean values from weighings of the youngest pair of leaves of a plant.

Both on treating the leaves and on treating the soil with alpha-hydroxycaprylic acid a transpiration-inhibiting action was found.

EXAMPLE 10

Markstamm cabbage was grown in Mitscherlich vessels. After emergence, the plants were thinned out to 3 per vessel. When they had grown to 20 cm. they were treated with various quantities of alphahydroxycapyrlic acid, namely 25 mg., 50 mg. and 100 mg. of alphahydroxycaprylic acid per vessel, in the form of a spray, through the leaf. The quantity of active substance thereby applied corresponds to a use quantity of 0.5 to 12 kg./ha. The spraying was carried out using a quantity of water corresponding to 400 l./ha. Since the wettability of the Markstamm cabbage is only slight, an alkylphenylpolyethylene ether was added as a wetting agent. Whilst all vessels were uniformly provided with water before treatment in such a way that 70% of the water-holding capacity of the soil was provided for, a subdivision into four different water supply levels took place after the treatment, namely with 40% water capacity, 50% water capacity, 60% water capacity and 70% water capacity. The water consumption of the individual vessels was determined by daily weight determinations. After a growth period of 16 weeks the experiment was harvested and the yields and the water consumption were determined. The results are given in the following tables:

FRESH WEIGHT OF MARKSTAMM CABBAGE
[mean value in g./vessel]

| Treatment | 40% WCP | 50% WCP | 60% WCP | 70% WCP |
|---|---|---|---|---|
| Control | 217.5 | 217.71 | 296.88 | 389.84 |
| 25 mg. of alphahydroxycaprylic acid | 229.03 | 248.53+ | 348.19+++ | 393.26 |
| 50 mg. of alphahydroxycaprylic acid | 228.79 | 261.38+++ | 338.54+++ | 405.13 |
| 100 mg. of alphahydroxycaprylic acid | 244.01 | 266.66+++ | 327.48+ | 394.91 |

NOTE.—WCP=Water capacity of the soil. Reliability of the differences from the control, within the individual water supply levels: +=Poor reliability; ++=Reliable; +++=Very good reliability.

WATER CONSUMPTION OF MARKSTAMM CABBAGE
[mean value in ccs./vessel minus evaporation through the soil]

| Treatment | 40% WCP | 50% WCP | 60% WCP | 70% WCP |
|---|---|---|---|---|
| Control | 8,423.75 | 9,190.75 | 11,166.13 | 13,739.00 |
| 25 mg. of alphahydroxycaprylic acid | 7,817.50 | 9,170.00 | 11,488.25+ | 13,077.75 |
| 50 mg. of alphahydroxycaprylic acid | 7,587.50 | 10,089.50+ | 12,187.00++ | 13,529.00 |
| 100 mg. of alphahydroxycaprylic acid | 8,127.50 | 10,057.00 | 12,247.00 | 13,281.50 |

NOTE.—Reliability of the differences from the control, within the individual water supply levels: +=Poor reliability; ++=Reliable; +++=Very good reliability.

TRANSPIRATION COEFFICIENTS
[Water consumption per g. of dry plant substance]

| Treatment | 40% WCP | 50% WCP | 60% WCP |
|---|---|---|---|
| Control | 244.09 | 245.94 | 225.53 |
| 25 mg. of alphahydroxycaprylic acid | 215.36 | 232.97 | 220.55 |
| 50 mg. of alphahydroxycaprylic acid | 201.90 | 247.66 | 235.04 |
| 100 mg. of alphahydroxycaprylic acid | 222.12 | 226.20 | 230.55 |

Accordingly, increases in yield resulted, which were in part very reliable, above all in the medium water supply levels. Since the water consumption also simultaneously rose in these groups, it is to be assumed that the water uptake capacity of the plants is improved through the treatment with alpha-hydroxycaprylic acid.

EXAMPLE 11

Winter wheat of the "Hubertus" variety was grown in Mitscherlich vessels and kept over the winter. The fertiliser applied was 1.0 g. of nitrogen as a soil fertiliser and 0.5 g. of nitrogen in each case, as a top fertiliser, both in the spring and to bring on the ears. When the growth height was 15 cm., the treatment with various use quantities of alpha-hydroxycaprylic acid, namely 25 mg., 50 mg. and 100 mg. of alpha-hydroxycaprylic acid per vessel, was carried out. From experience, these use quantities correspond to quantities of active substance of 0.5 to 12 kg./ha. Spraying was carried out using an amount of water of 400 l./ha., with the addition of an alkylphenylpolyethylene ether as the wetting agent. After spraying, the experiment was divided into two levels of water supply. One group was watered daily in such a way that the soil was provided with 40% of the water which it could hold, and the other group as provided with 70%. The water consumption of the individual vessels was determined daily by weighing and was recorded. At the end of the experiment the grain weight, straw weight and total weight of the wheat were determined, the total water consumption per vessel was established and the transpiration coefficient was determined therefrom. This led to the following results:

HARVEST WEIGHT AND WATER CONSUMPTION OF WINTER WHEAT

| Treatment with— | Grain yield in g. (dry weight) | Total yield in g. (dry weight) | Water consumption in ccs. | Transpiration coefficient in water consumption per g. relative to— | |
|---|---|---|---|---|---|
| | | | | Total yield | Grain |
| 40% WCP: | | | | | |
| Control | 45.20 | 95.64 | 22.615 | 236.46 | 500.33 |
| 25 mg. of α-hydroxycaprylic acid | 50.26++ | 105.80+++ | 24.811+ | 234.51 | 493.65 |
| 50 mg. of α-hydroxycaprylic acid | 51.58++ | 103.88+++ | 24.921+ | 239.90 | 483.15 |
| 100 mg. of α-hydroxycaprylic acid | 51.42++ | 104.50+++ | 25.373++ | 242.80 | 493.45 |
| 70% WCP: | | | | | |
| Control | 78.10 | 169.04 | 43.520 | 257.45 | 557.23 |
| 25 mg. of α-hydroxycaprylic acid | 76.02 | 173.30 | 44.588 | 257.29 | 586.53 |
| 50 mg. of α-hydroxycaprylic acid | 69.96+++ | 169.78 | 43.248 | 254.94 | 618.70 |
| 100 mg. of α-hydroxycaprylic acid | 73.66 | 169.88 | 43.578 | 256.52 | 591.61 |

NOTE.—Reliability of the differences from the control, within the water supply levels: +=poor reliability; ++=reliable; +++=very good reliability.

It was found that if the water supply was not an optimum, the yield of winter wheat could be improved by treatment with alphahydroxycaprylic acid. This resulted in a reliable increase in the grain yield and a very reliable increase in the total yield. Since the water consumption rose at the same time, the transpiration coefficient of the treated plants remained identical to those of the control within the limits of error. It must therefore be assumed that the water uptake capacity of the plants is improved by the treatment with alpha-hydroxycaprylic acid.

EXAMPLE 12

Markstamm cabbage was grown in Mitscherlich vessels. After emergence, the plants were thinned out to 3 per vessel. When they had grown to 20 cm., they were treated with various use quantities (3.75 kg./ha., 7.50 kg./ha. and 15.00 kg./ha.) of the active substances mentioned below. The treatment was carried out as a leaf spraying, using a quantity of water of 400 l./ha. In order to achieve better wetting, an alkylphenol-polyethylene ether was added as a wetting agent. After the treatment the vessels were constantly kept under low water supply (50% of the water capacity of the experimental soil). After a growth period of 16 weeks the vessels were harvested. The following harvest weights resulted:

DRY WEIGHTS IN G./VESSEL

| Treatment | 3.75 kg./ha. | 7.50 kg./ha. | 15.00 kg./ha |
|---|---|---|---|
| Control | 36.02 | | |
| Alpha-hydroxy-alpha-hexylmalonic acid | 39.43 | 42.02 | 44.65 |
| Alpha-aminocaprylic acid | 40.50 | 39.65 | 44.28 |
| Alpha-hydroxycaprylic acid | 39.50 | 40.12 | 40.08 |
| Alpha-hydroxycaprylic acid amide | 40.02 | 40.87 | 40.73 |

An evaluation with analysis of the variances showed that the yield increases quoted above are reliable to 10–20% relative.

We claim:

1. A process for increasing the yield and inhibiting transpiration of plants, which comprises treating the plants with an effective amount of an active compound selected from the group consisting of a compound of the formula

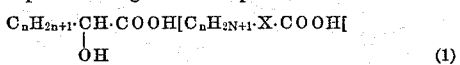

(1)

in which $n$ denotes an integer from 5 to 8

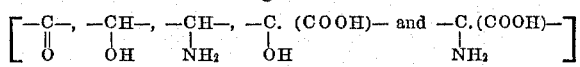

and a salt, lower alkyl ester, lower hydroxyalkyl ester, amide lower monoalkylamide and lower dialkylamide thereof.

2. A process according to claim 1 wherein the compound is selected from the group consisting of $\alpha$-hydroxy caprylic acid and salts thereof.

3. A process according to claim 2, in which the plants are treated with the active substances in an amount of 0.5 to 15 kg. per hectar relative to the free acid.

4. A process according to claim 2, in which the treatment is carried out by spraying the plant with an aqueous spraying liquid which contains the active compound in a dissolved, suspended or emulsified form.

5. A process according to claim 2, in which the treatment is carried out by spraying the soil between the plants with a spraying liquid which contains the active compound in a dissolved, suspended or emulsified form.

6. A process according to claim 2, in which the treatment is carried out by incorporating a solid composition containing the active compound into the soil before the emergence of the plants.

References Cited

UNITED STATES PATENTS

| 2,793,132 | 5/1957 | Davis et al. | 106—243 |
| 3,001,862 | 9/1961 | Sowa | 71—113 |

FOREIGN PATENTS

| 625,361 | 8/1961 | Cananda | 71—113 |

JAMES O. THOMAS, JR., Primary Examiner

U.S. CL. X.R.

71—106, 118

UNITED STATES PATENT OFFICE
CERTIFICATE OF CORRECTION

Patent No. 3,712,804  Dated January 23, 1973

Inventor(s) Walter Muller, Hubert Mayr, Ferdinand Weinrotter, Walter Frohner, Elfriede Presoley and Gustav Kollisch It is certified that error appears in the above-identified patent and that said Letters Patent are hereby corrected as shown below:

Claim 1, please delete the bracketted formulae, i.e.:

and $[C_nH_{2N+1} \cdot X \cdot COOH[$

Signed and sealed this 27th day of August 1974.

(SEAL)
Attest:

McCOY M. GIBSON, JR.  
Attesting Officer

C. MARSHALL DANN  
Commissioner of Patents